United States Patent [19]
Allen

[11] Patent Number: 4,521,492
[45] Date of Patent: Jun. 4, 1985

[54] LIGHT REFRACTIVE COATED PAPERBOARD

[75] Inventor: Robert L. Allen, Park Ridge, Ill.

[73] Assignee: Champion International Corporation, Stamford, Conn.

[21] Appl. No.: 365,538

[22] Filed: Apr. 5, 1982

[51] Int. Cl.$^3$ .................. B32B 15/12; B32B 29/04
[52] U.S. Cl. .................................. 428/464; 106/20; 106/290; 106/300; 428/204; 428/342; 428/461; 428/469; 428/472; 428/511; 428/913; 524/441; 524/537.1
[58] Field of Search .............. 428/454, 461, 464, 472, 428/467, 469, 511, 537, 913, 342, 204; 106/20, 290, 300; 524/441

[56] References Cited

U.S. PATENT DOCUMENTS 2,941,894  6/1960  McAdow ................. 524/441 X
3,463,659  8/1969  Dragoon et al. ................ 428/454
4,233,195  11/1980  Mills ................................. 106/20 X Primary Examiner—Thomas J. Herbert, Jr.
Attorney, Agent, or Firm—Evelyn M. Sommer

[57] ABSTRACT

A light refractive coated paperboard is provided comprising a normally oil and grease permeable substrate, a non-leafing silver-colored ink layer applied to one surface of said substrate and a highly pigmented (titanium dioxide) ink layer superimposed on said non-leafing silver colored ink layer and possibly a clear lacquer or varnish layer superimposed on the TiO$_2$ containing ink layer. The above order of coating layers produces a somewhat flat appearance; for producing a more metallic look the order of the silver-colored ink layer and of the highly pigmented (TiO$_2$) layer are reversed. The light refractive coated paperboard conceals, from the outer surface of a package made therefrom, oil and grease stains which have penetrated the inner surface of the package. A method of making such light refractive coated paperboard is also disclosed.

8 Claims, No Drawings

4,521,492

LIGHT REFRACTIVE COATED PAPERBOARD

BACKGROUND OF THE INVENTION

1. Field of the Invention

This invention relates to light refractive coated paper board, milk carton board, papers and the like and more specifically, it relates to light refractive coated paper board which mask the stains produced by grease penetration into the substrate stock. The invention also includes the method of making such light refractive coated paper board products.

2. Discussion of Prior Art

Large sums of money are spent on designing packaging materials to enhance the attraction to the consumer for the product contained therein. The design encompasses not only the size and shape of the package but more importantly, the color and graphics printed on the package. Obviously, if the nature of the packaged product is such that it produces materials such as oils and greases which can penetrate the packaged materials and stain the exposed surface of the package, the aesthetic appearance of the package is greatly reduced as is, most probably, its attraction to the consumer.

Previous efforts towards eliminating the problem of stains produced by oil and grease penetration into the packaging stock have been directed at preventing the grease from penetrating into the stock. Foil laminated packaging stock could be used but is relatively expensive. Other methods of preventing grease penetration into the stock which have heretofore been employed are polyolefin coatings, fluorocarbon coatings, saturation with paraffin or microcrystalline waxes, coating one or both sides of the stock with polymer fortified waxes, and the like; however, these have generally proven to be unsuccessful.

U.S. Pat. No. 3,463,659 describes the use of a barrier coating over a paper substrate. This base coating consists of 52-88% inorganic pigment such as clay, calcium carbonate or titanium dioxide, 2-20% thermoplastic pigment having a glass transition temperature greater than 150° F., 5-25% of synthetic emulsion polymer adhesive and 5-25% of a water or alkali soluble adhesive such as starch, casein or protein. The function of this base coat is to fill, smooth and solvent-proof the surface of the paper substrate. This base coat also can be applied to the underside of the paper substrate to prevent curling. If the paper substrate is not filled and smoothed by one application of the base coat, more of this relatively expensive coating can be employed. The base coat layer is further smoothed and densified by super calendering. The base coat is then covered by a lacquer over coat followed by a vacuum deposited metal film. The lacquer over coat must provide the mechanism for building the physical characteristics that are desired in the final sheet e.g., oil resistance. The resulting metallized paper can be further primed for printing with a lacquer top coat and is reported to possess excellent oil resistance i.e., exposure of the backside of the metallized paper would provide, in addition to a moisture barrier, a barrier to grease and oils.

In many instances, it is either undesirable to employ a metallized substrate as a packaging material, particularly where exterior coloration and/or printing is desired on the surface of the package, or it is impractical or too expensive to employ a barrier to oil and/or grease absorption. In such instances, it would be desirable to provide an easily printable packaging material which could mask the appearance of unsightly oleaginous stains from the eyes of a prospective purchaser.

Accordingly, it is an object of the present invention to produce a light refractive coated paper board which conceals grease or oil stains absorbed by the inner surface of the substrate which would otherwise normally mar the appearance of the outer surface of the finished structure.

It is another object of the present invention to provide a coated paper board which conceals stains would distract from the aesthetic appearance of the printing, color and/or shape of the individual package.

Yet another object of the invention is to duplicate almost exactly the appearance of a colored foil laminated paper board without the use of foil, characterized by light refractive properties imparting enhanced effectiveness for masking grease.

It is still another object of the present invention to provide a method for making such light refractive coated paper board in an economically feasible and simple manner.

SUMMARY OF THE INVENTION

The foregoing as well as other objects are accomplished by the present invention which provides a light refractive coated paper board comprising a normally oil and/or grease permeable substrate material coated with: (1) a non-leafing silver ink, the preferred embodiment being a non-leafing silver-colored ink composition comprising a dispersion of aluminum powder in a nitrocellulose resin; and (2) a highly pigmented white ink layer, preferably titanium dioxide dispersed in a nitrocellulose resin applied over the non-leafing silver-colored ink layer. In some cases a transparent polymeric overlayer is superimposed upon said pigmented polymeric layer.

This particular order of the two ink layers provides a flat look i.e., a more or less non-metallic appearance. If a more metallic i.e., foil like appearance is desired, the highly pigmented white ink is first deposited on the substrate and thereafter the non-leafing silver ink applied over the highly pigmented white ink layer. Additional colorants to produce the desired color can be added to the silver ink layer. Examples of such colored inks are available from Inmont as 81 ES 323 gold and 81 ES 553 yellow.

DETAILS OF THE INVENTION

The present invention is directed to a light refractive coated product which comprises a substrate which normally absorbs grease and/or oil, such as paper board, milk carton board, paper and the like, a non-leafing silver colored ink layer, and a highly pigmented white ink layer superimposed thereon.

The selection of the substrate material is generally determined by the end use of the product rather than by any limitation in the coating process. Suitable substrates are paper stock ranging in thickness from 0.001" to 0.004" as well as any normally grease and/or oil permeable polymeric film to which the ink layer will adhere, examples of which are polyolefin and polyester films and laminates. The preferred embodiment of the invention is paper board with a thickness in the range of 0.006" to 0.038".

While pretreatment of the substrate is not required in accordance with the invention, most paper and paper board substrates intended for consumer packaging applications are in fact calendered and clay coated to provide the smoothness necessary for good printing quality. Such smoothness of surface is likewise desirable in the process of the invention since smoothness of the printing surface facilitates good continuity of the ink layer. However, any non-porous paper and/or polymeric film can be utilized as a substrate.

The silver-colored ink composition utilized in the present invention must be of the non-leafing variety. When a leafing silver ink is used, the adhesion of the ink to the paper board substrate is unsatisfactory. The silver-colored ink is a dispersion of aluminum powder in a modified nitrocellulose resin containing as solvents toluene and normal propyl acetate. Examples of suitable ink compositions are silver ink 81 ES 126 available from Inmont Corporation, Chicago, Ill., and silver ink ASC-10323 available from Thiele-Engdahl, Addison, Ill.

The silver ink is applied to the substrate by rotogravure printing using a conventional 150 line screen cylinder. It is also possible to use the conventional flexographic printing machines.

The non-leafing silver ink is used so as to obtain a dry solids deposition of approximately 0.2 pound per thousand square feet of substrate. It is possible to achieve satisfactory coatings for the intended purpose using lower coating weights, providing good continuity of the ink layer is achieved.

The ink layer following deposition is allowed to dry. Preferably heat is provided as this facilitates evaporation of the solvents and therewith drying of the ink.

The ink used in the first layer as above-described is a non-leafing silver ink. The use of silver inks based on "leafing" silver pigments as for instance a silver ink available from Inmont No. 78 ES 473, has been attempted. While the grease masking properties of such ink, when used in conjunction with the highly pigmented titanium dioxide layer, for instance 80 ES 293, are satisfactory, the adhesion of the ink to the substrate is not adequate for packaging application, an intra-facial failure occurs in the ink layer. This is easily shown as scratching of the coated paper board substrate with a finger nail is sufficient to separate off the coating.

It should be noted that in certain instances, pigments originally manufactured as a "leafing" grade may be converted to non-leafing grade by extraction with polar organic solvents.

The ink suitable for use in the first layer has been defined above as a silver colored ink. It should be understood that other pigments such as a gold colored pigment, blue, yellow or terra cotta pigment can be included in the formulation to produce different colored and/or metallic effects. Preferably however, the ink is a silver colored ink comprised of an aluminum pigment dispersed in an appropriate resin vehicle, for example a nitrocellulose resin. The choice of resin vehicle is based to a considerable extent on the nature of the substrate and the ability of the resin to adhere thereto.

The non-leafing aluminum pigment can be prepared by grinding a solid aluminum ingot in a ball mill in an inert atmosphere in order to prevent oxidation due to air access.

The grinding operation can also be carried out in the presence of small amounts of stearic or oleic acid. The stearic or oleic acid serves to coat the individual aluminum particles and minimize any possible oxidation. However, stearic and oleic acids also function as lubricants and this property contributes to a somewhat poorer substrate adhesion.

When a foil like or metallic appearance is desirable as for instance in a Margarine carton, the grease masking is obtained by first applying the highly pigmented white ink for instance 80 ES 293 and applying thereover the non-leafing silver ink.

A highly pigmented white ink layer is then applied over the non-leafing silver ink coating. It is believed that the combination of the metallic silver layer and the heavily pigmented over layer alters light refraction from the surface of the substrate and thereby masks the appearance of any oil or grease stains which have absorbed through the substrate. Also, the heavily pigmented layer eliminates any outward metallic appearance which simplifies any subsequent printing steps. A modified nitrocellulose resin heavily loaded with titanium dioxide, is preferred for this purpose. Particularly suitable for this layer are 80 ES 293 available from Inmont Corporation, and AWC 10553 available from Thiele- Engdahl.

The combination of the titanium dioxide content of the white ink and the aluminum pigment in the underlying silver ink on the paperboard provide the light refractive coating which is effective to conceal from the outer surface of a package made therefrom, any oil and grease stains which have penetrated the inner surface of the package.

The white ink layer is applied by conventional rotogravure printing techniques, for instance using a 120 line screen cylinder or alternatively by the conventional flexographic techniques.

The white ink i.e., the highly pigmented layer, is utilized in the form of a dispersion of titanium dioxide in an appropriate resin vehicle and preferably in a modified nitrocellulose resin system containing a solvent for instance toluene or normal propyl acetate.

The white ink layer is put down so as to achieve a dry solids deposition of approximately 0.9 pounds per thousand square feet of substrate. It may be possible to achieve satisfactory results at lower coating weights but it is esssential that the coating weight selected provide good continuity of the ink layer.

The white ink coated paper board is then subjected to drying. Preferably heat is used for the drying as this facilitates removal of the solvents. The drying can be done in an on line operation, the temperature being regulated to produce drying with the coated paper board traveling at a rate of about 700 feet/minute.

By the term "highly pigmented" used in connection with the white ink layer, there is meant a high solids content ink and more specifically an ink containing at least 40% by weight of titanium dioxide pigment. The example of a white ink previously mentioned and namely 80 ES 293, contains 48% by weight of $TiO_2$. A specific formulation of a suitable white ink would be one containing 62% solids having the following distribution:

45% $TiO_2$
7% plasticizer
10% nitrocellulose resin.

As set out above it is the combination of the two layers i.e., metallic ink/highly pigmented layer which provides the light refraction essential for the masking effect.

It is understood that while the invention has been described above as requiring the highly pigmented layer to be applied onto the silver ink layer, this order can be reversed with the same masking results when a more metallic or foil like appearance is desired.

As with any printed packaging material, the fully printed substrate may itself be overlaid with a clear, grease resistant lacquer so as to improve scuff-resistance of the finished package.

The light refractive coated packaging material of this invention is very effective in masking stains produced by greasy substances penetrating into the substrate stock. Thus, these coated products are particularly suitable for the packaging of food products containing edible oils and, particularly for the packaging of butter and margarine. Other products, for example liquids such as fuel oils and additives, cosmetics, solids including soaps, food products, especially cookies and pet food products, and the like may also be packaged in coated board and papers produced in accordance with the invention. However, in applications where an even higher degree of grease or oil masking is necessary or desirable, there may be used, in addition to the layers called for by this invention, one or more coatings of grease-resistant polymeric materials. For example either side of the substrate may additionally be directly coated with such polymeric materials as polyethylene, polypropylene, polyesters, polyvinylidine chloride, etc.; the specific polymeric materials to be used will depend, of course, on the nature of the grease or oil involved. Also suitable would be laminations or coextrusions of these polymeric materials or similar materials, which would serve as a physical barrier to grease or oil penetration. The utilization of this invention in combination with a polymeric barrier is beneficial in that "pinholes" or other discontinuities in the physical barrier may permit grease or oil penetration to the paperboard substrate. The silvercolored ink layer and highly pigmented white ink overlayer of this invention would then mask any visible indication of such penetration. In addition, the use of the system according to this invention is also effective when grease or oil penetration of the substrate occurs via edge wicking at the exposed lateral edges of the package.

The light refractive coating of this invention may also be employed on paperboard substrates which have been fluorochemically treated during their manufacture or in a subsequent converting operation. Such treatments inhibit the absorption of grease and oil into the paper fibers and thus prevent penetration of the substrate. Any grease staining due to penetration resulting from discontinuities in the fluorochemical treatment is masked by the layers provided according to this invention.

While not necessarty to the invention, it is preferable for a clear, transparent polymeric over layer to be applied onto the coated paper or paper board. The particular polymeric overlayer which is selected will depend on the application of the packaging. This over layer is of course applied after all of the identifying and printing information has been put down. Examples of suitable materials for the overlayer are corona discharge treated or flame treated polyolefins, such as polyethylene, polyesters such as polyethylene terephthalate, ethyl cellulose resin and the like.

While not wishing to be bound by any particular scientific theory, it is believed that the technical basis underlying this invention is twofold. First, the non-leafing silver colored pigment, dispersed in the resin vehicle, plus the high percentage of titanium dioxide in the white resin vehicle layer form a physical barrier which retards grease and oil penetration. Secondly, the refractive index of the masking system on paperboard substrates is unaltered by grease and oil penetration and thus, no staining is visually apparent on the package.

This invention will be more readily understood by reference to the following examples, which are included for illustrative purposes only and not as limitations.

EXAMPLE 1

Paperboard (clay coated 0.012" caliper solid bleached sulfate paper board) such as is conventionally used in the manufacture of margarine and butter folding containers was subjected to printing with the inks as hereinafter described and in the order set forth, using the conventional rotogravure process and a 150 line screen rotogravure cylinder First down—ASC-10323 silver @ 0.2 lbs/thousand sq. feet (dispersion of a leafing grade aluminum pigment in a nitrocellulose resin with toluene and isopropyl acetate as solvent)

Second down—AWC-10553 white @ 0.4 lbs/thousand sq. feet (dispersion of titanium dioxide in a nitrocellulose resin with toluene and isopropyl acetate as solvent)

Third down—AJM-10670 top lacquer @ 0.2 lbs/thousand sq. feet (modified polystyrene resin in toluene)

Drying of the individual layers was carried out by exposure to a temperature of between about 150 and 200° F. for about 2 to 5 seconds following each printing step.

The coated board was cut up into suitable sized proof pieces (4"×8" with the paper board grain in the 4" direction). The proofs were hand scored using a #2 rule. The proof stock was then flexed about the score line 180° and the back sides treated with a ¼" wide bead of liquid margarine.

The following observations were made during the test run:

| Time Hours/Minutes | Observation |
| --- | --- |
| 0:00 | Test begun. Treatment with liquid margarine. |
| 0:15 | Grease starting to soak through, but no staining evident. |
| 6:30 | Grease stain 2" wide on back side, stained on front, but well masked. |
| 23:10 | Grease stain 4" wide on back side. Stain well masked on overall proof, but somewhat evident on the silver ink only portion of the test specimen. |
| 48:15 | No change |
| 143:40 | Grease stain somewhat more pronounced, but still well masked. Test concluded. |

While the coating was effective to mask the grease stain, the coating could be easily removed by rubbing with a thumb.

EXAMPLE 2

The procedure set out in Example 1 was repeated but with the following inks:

First Down—78 ES 473 silver @ 0.2 lbs/thousand sq. feet (dispersion of aluminum pigment in a modified nitrocellulose resin with toluene and normal propyl acetate as solvents)

Second Down—80 ES 293 white @ 0.4-0.9 lbs/thousand sq. feet (dispersion of $TiO_2$ in a modified nitro cellulose resin with toluene and normal propyl acetate solvents)
Third Down—F-82738 "E type OPV" @ 0.2 lbs/thousand sq. feet (ethyl cellulose resin in a solvent blend)

The following observations were made during the test run:

| Time Hours/Minutes | Observations |
| --- | --- |
| 0:00 | Test begun. Treatment with liquid margarine. |
| 2:00 | Grease stain 2" wide on back side. Fully masked on front. |
| 4:00 | Grease stain 2½" wide on back side. Fully masked on front. |
| 21:30 | Grease stain 3½" wide on back side. Still masked on front. |
| 45:15 | No change. Test concluded. |

EXAMPLE 3

Example 2 was repeated, omitting the overcoat layer with the same results.

EXAMPLE 4

Example 1 was repeated with the following inks in the printing sequence as shown:

| | | | |
| --- | --- | --- | --- |
| (A) | First down | 81 ES 126 Silver | lbs/ream |
| | Second down | 80 ES 293 white | lbs/ream |
| | Third down | F-89011 OPV | lbs/ream |
| (B) | First down | 81 ES 126 silver | |
| | Second down | 80 ES 293 white | |
| | Third down | 81 ES 553 yellow | |
| | Fourth down | F-89011 OPV | |
| (C) | First down | 80 ES 293 white | |
| | Second down | 81 ES 553 yellow | |
| | Third down | F-89011 OPV | |

In addition, samples of overall paraffin wax coated solid bleached sulfate stock (PW), Seal Sheen wax coated solid bleached sulfate stock (SS) and 0.5 mil matte polyethylene solid bleached sulfate stock (P) were prepared. All of the samples were cut to a size of 6"×8" and a CD score placed thereon. The specimens were flexed 180° about the score line.

Approximately ⅛ pound of margarine was transferred to a 100 ml beaker and the contents melted in a 115° F. oven. The test specimens were placed in the oven and the score areas treated with a ½" bead of liquid margarine delivered via a medicine dropper.

The following observations were made during the test run:

| Time Hours/minutes | Observation |
| --- | --- |
| 0:00 | Test begun. Treatment with liquid margarine. |
| 2:25 | A - fully masked |
| | B - fully masked |
| | C - fully masked |
| | SS - completely stained |
| | PW - completely stained |
| | P - Edge wicking and 2 pinhole stains |
| 75:25 | A - fully masked |
| | B - fully masked |
| | C - fully masked |
| 78:25 | A - fully masked |
| | B - fully masked |
| | C - fully masked |

EXAMPLE 5

In place of the paraffin wax coated board a commercial non-barrier gold foil carton was used (N).

Example 4 was repeated with the following inks in the printing sequence as hereinafter set out.

| | | | |
| --- | --- | --- | --- |
| (D) | First down | 81 ES 126 silver | @ 0.2 lbs/thousand sq. feet |
| | Second down | 80 ES 293 white | @ 0.9 lbs/thousand sq. feet |
| | Third down | 81 ES 323 gold | @ 0.2 lbs/thousand sq. feet |
| | Fourth down | F-89011 O/P | @ 0.2 lbs/thousand sq. feet |
| (E) | First down | 80 ES 293 white | @ 0.9 lbs/thousand sq. feet |
| | Second down | 81 ES 323 gold | @ 0.2 lbs/thousand sq. feet |
| | Third down | F-89011 O/P | @ 0.2 lbs/thousand sq. feet |

The following observations as to masking were made during the test run:

| Time Hours/Minutes | Observation |
| --- | --- |
| 0:00 | Test begun. Treatment with liquid margarine |
| 45 | D - no change |
| | E - no change |
| | P - no change |
| | SS - completely stained |
| | N - Effectively masked in gold area only |
| 2:25 | D - no change |
| | E - no change |
| | P - no change but edgewick failure |
| | SS |
| | N - effectively masked in gold area only |
| 36:30 | D - no change |
| | E - no change |
| | P - no change |
| | SS |
| | N - effectively masked in gold area only |

What is claimed is:
1. A light refractive packaging material for packaging grease or oil-containing substances, said material comprising:
(a) a substrate which is normally susceptible to permeation by oil or grease;
(b) a first ink layer printed on one surface of said substrate;
(c) a second ink layer printed directly on said first layer;
(d) one ink layer comprising a non-leafing metallic ink and the other ink layer comprising a highly pigmented white ink; and
(e) said first and second ink layers combining to mask the appearance of grease or oil stains on said one surface of said substrate which stains are the result of grease or oil permeating said substrate from the surface thereof opposite said one surface.

2. The packaging material of claim 1, wherein said non-leafing metallic ink comprises a dispersion of aluminum powder in a thermoplastic resin.

3. The packaging material of claim 1, wherein said highly pigmented ink is a white ink containing at least forty percent by weight of titanium dioxide pigment.

4. The packaging material of claim 1, further comprising a layer of transparent organic polymer coated onto said second ink layer.

5. A light refractive packaging material for packaging grease or oil-containing substances, said material comprising:
   (a) a paperboard substrate;
   (b) a first layer of a non-leafing silver colored ink printed on one surface of said paperboard substrate;
   (c) a second layer of a highly pigmented white ink printed directly onto said first layer of said non-leafing silver colored ink; and
   (d) said first and second ink layers combining to mask the appearance of grease or oil stains on said one surface of said paperboard substrate, which stains are the result of grease or oil permeating said paperboard substrate from the surface thereof opposite said one surface.

6. The packaging material of claim 5 further comprising a layer of transparent organic polymer coated onto said highly pigmented white ink layer.

7. A light refractive packaging material for packaging grease or oil-containing substances, said material comprising:
   (a) a paperboard substrate;
   (b) a first layer of highly pigmented white ink printed on one surface of said paperboard substrate;
   (c) a second layer of a non-leafing silver colored ink printed directly onto said first layer of said highly pigmented white ink; and
   (d) said first and second ink layers combining to mask the appearance of grease or oil stains on said one surface of said paperboard substrate, which stains are the result of grease or oil permeating said paperboard substrate from the surface thereof opposite said one surface.

8. The packaging material of claim 7 further comprising a layer of transparent organic polymer coated onto said non-leafing silver colored ink layer.

* * * * *